United States Patent
Yasukawa et al.

(10) Patent No.: US 9,838,908 B2
(45) Date of Patent: Dec. 5, 2017

(54) RADIO BASE STATION, USER TERMINAL AND RADIO COMMUNICATION METHOD

(71) Applicant: NTT DOCOMO, INC., Tokyo (JP)

(72) Inventors: Shimpei Yasukawa, Tokyo (JP); Kazuaki Takeda, Tokyo (JP); Hiroyuki Ishii, Palo Alto, CA (US); Xiang Yun, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/889,363

(22) PCT Filed: Apr. 24, 2014

(86) PCT No.: PCT/JP2014/061507
§ 371 (c)(1),
(2) Date: Nov. 5, 2015

(87) PCT Pub. No.: WO2014/181694
PCT Pub. Date: Nov. 13, 2014

(65) Prior Publication Data
US 2016/0119816 A1    Apr. 28, 2016

(30) Foreign Application Priority Data

May 9, 2013  (JP) ................................ 2013-099723

(51) Int. Cl.
*H04W 72/00* (2009.01)
*H04W 28/08* (2009.01)
(Continued)

(52) U.S. Cl.
CPC ......... *H04W 28/08* (2013.01); *H04L 43/0876* (2013.01); *H04W 28/0247* (2013.01);
(Continued)

(58) Field of Classification Search
CPC ..... H04W 24/10; H04W 24/02; H04W 36/30; H04W 36/0083; H04W 36/22;
(Continued)

(56) References Cited

U.S. PATENT DOCUMENTS

2009/0264134 A1* 10/2009 Xu ..................... H04W 36/32
455/437

OTHER PUBLICATIONS

International Search Report issued in PCT/JP2014/061507 dated Jun. 24, 2014 (2 pages).
3GPP TR 36.814 V9.0.0; "3rd Generation Partnership Project; Technical Specification Group Radio Access Network; Evolved Universal Terrestrial Radio Access (E-UTRA); Further advancements for E-UTRA physical layer aspects (Release 9)"; Mar. 2010 (104 pages).
(Continued)

*Primary Examiner* — Kwasi Karikari
(74) *Attorney, Agent, or Firm* — Osha Liang LLP

(57) ABSTRACT

The present invention is designed to use radio resources effectively and improve the throughput of a radio communication system even when a plurality of small cells are placed densely. A radio base station controls the connecting cell of a user terminal, and has a selection section that selects candidate cells, the received power and/or the received quality of which in the user terminal is equal to or greater than a predetermined value, and a determining section that calculates the amount of data to transmit to serving user terminals, for each candidate cell, by taking into account the frequency band that is used, and determines a candidate cell where the amount of data is small, as the connecting cell of the user terminal.

12 Claims, 12 Drawing Sheets

(51) Int. Cl.
  *H04W 48/20* (2009.01)
  *H04W 28/02* (2009.01)
  *H04W 48/18* (2009.01)
  *H04L 12/26* (2006.01)
  *H04L 12/835* (2013.01)

(52) U.S. Cl.
  CPC ....... *H04W 28/0268* (2013.01); *H04W 48/18* (2013.01); *H04W 48/20* (2013.01); *H04L 47/30* (2013.01)

(58) Field of Classification Search
  CPC . H04W 36/0088; H04W 36/04; H04W 48/20; H04W 72/0446; H04W 52/143; H04W 28/08; H04W 36/0061; H04W 52/244; H04W 72/1226; H04W 36/08; H04W 72/042; H04W 72/085; H04W 88/02; H04W 36/0094; H04W 72/04
  See application file for complete search history.

(56) References Cited

OTHER PUBLICATIONS

3GPP TS 36.300 V8.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).

* cited by examiner

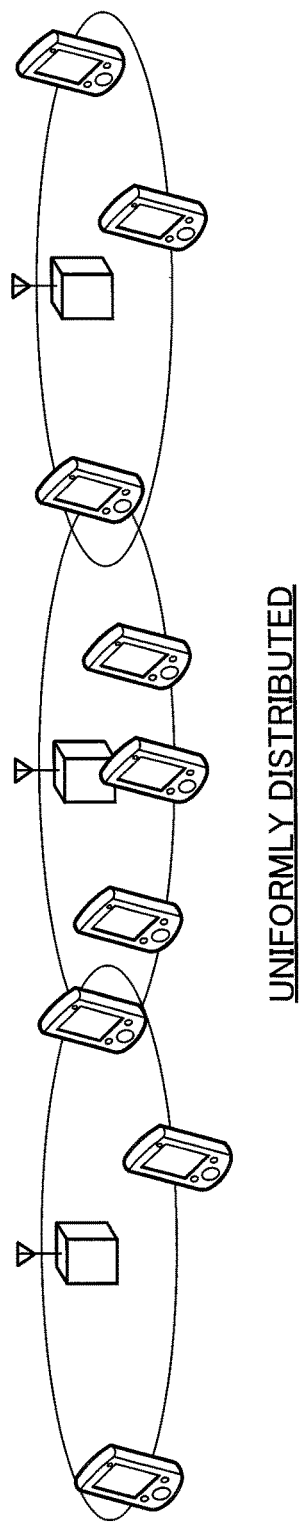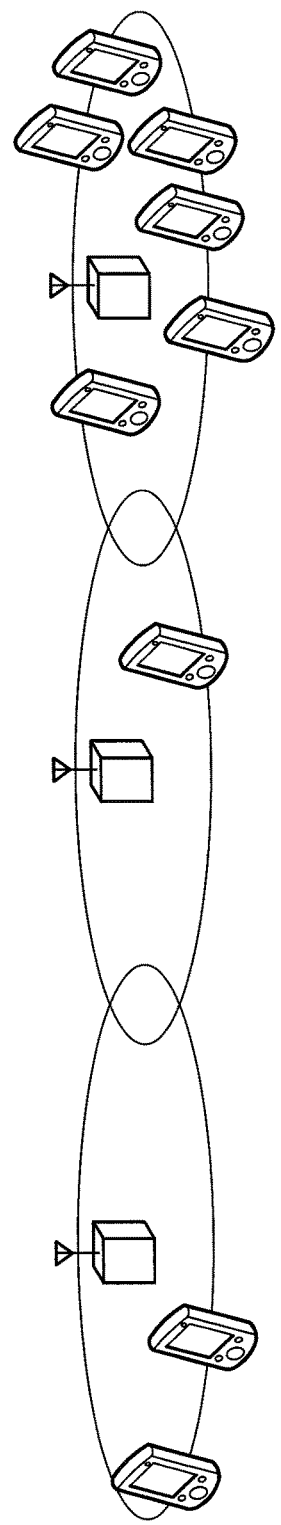

RADIO BASE STATION, USER TERMINAL AND RADIO COMMUNICATION METHOD

TECHNICAL FIELD

The present invention relates to a radio base station, a user terminal and a radio communication method in a next-generation mobile communication system.

BACKGROUND ART

In a UMTS (Universal Mobile Telecommunications System) network, the specifications of long-term evolution (LTE) have been drafted for the purposes of further increasing high-speed data rates, providing low delay and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single-Carrier Frequency Division Multiple Access) is used in uplink channels (uplink).

Also, successor systems of LTE (referred to as, for example, "LTE-advanced" or "LTE enhancement" (hereinafter referred to as "LTE-A")) have been under study for the purpose of achieving further broadbandization and increased speed beyond LTE. In an LTE-A system, a HetNet (Heterogeneous Network), in which small cells (for example, pico cells, femto cells and so on) having a local coverage area of a radius of approximately several tens of meters are formed inside a macro cell having a wide coverage area of a radius of approximately several kilometers, is under study (see, for example, non-patent literature 2).

CITATION LIST

Non-patent Literature

Non-Patent Literature 1: 3GPP TS 36.300 "Evolved UTRA and Evolved UTRAN Overall Description"
Non-Patent Literature 2: 3GPP TR 36.814 "E-UTRA Further Advancements for E-UTRA Physical Layer Aspects"

SUMMARY OF INVENTION

Technical Problem

In the above HetNet, a plurality of small cells are placed in the macro cell. Furthermore, generally, in radio communication systems, the distribution of users and the load of traffic are not fixed, but change over time or between locations. Consequently, when many small cells are placed in a macro cell, the small cells are not placed uniformly in the macro cell, but are more likely to be placed in such a manner that their density and environment vary (sparse and dense) between locations.

Now, since the small cells have small coverage areas compared with the macro cell, the number of users and the traffic load in each small cell change in accordance with the moving speed of user terminals, the conditions of communication and so on. For example, when the number of users/the load of traffic is uneven in a specific cell, there is a threat that the efficiency of the use of radio resources (spectral efficiency) decreases, and the throughput of the radio communication system decreases.

The present invention has been made in view of the above, and it is therefore an object of the present invention to provide a radio base station, a user terminal and a radio communication method, whereby it is possible to use radio resources effectively and improve the system throughput of radio communication systems even when a plurality of small cells are placed densely.

Solution to Problem

A radio base station, according to the present invention, is a radio base station to control the connecting cell of a user terminal, and has a selection section that selects candidate cells, the received power and/or the received quality of which in the user terminal is equal to or greater than a predetermined value, a calculation section that calculates the amount of data to transmit to serving user terminals, for each candidate cell, by taking into account a frequency band that is used, and a determining section that determines a candidate cell where the amount of data is small, as the connecting cell of the user terminal.

Advantageous Effects of Invention

According to the present invention, it is possible to use radio resources effectively and improve the system throughput of radio communication systems even when a plurality of small cells are placed densely.

BRIEF DESCRIPTION OF DRAWINGS

FIG. 2 provides diagrams to explain the number of user terminals connected to each small cell.

DESCRIPTION OF EMBODIMENTS

Figure 1:
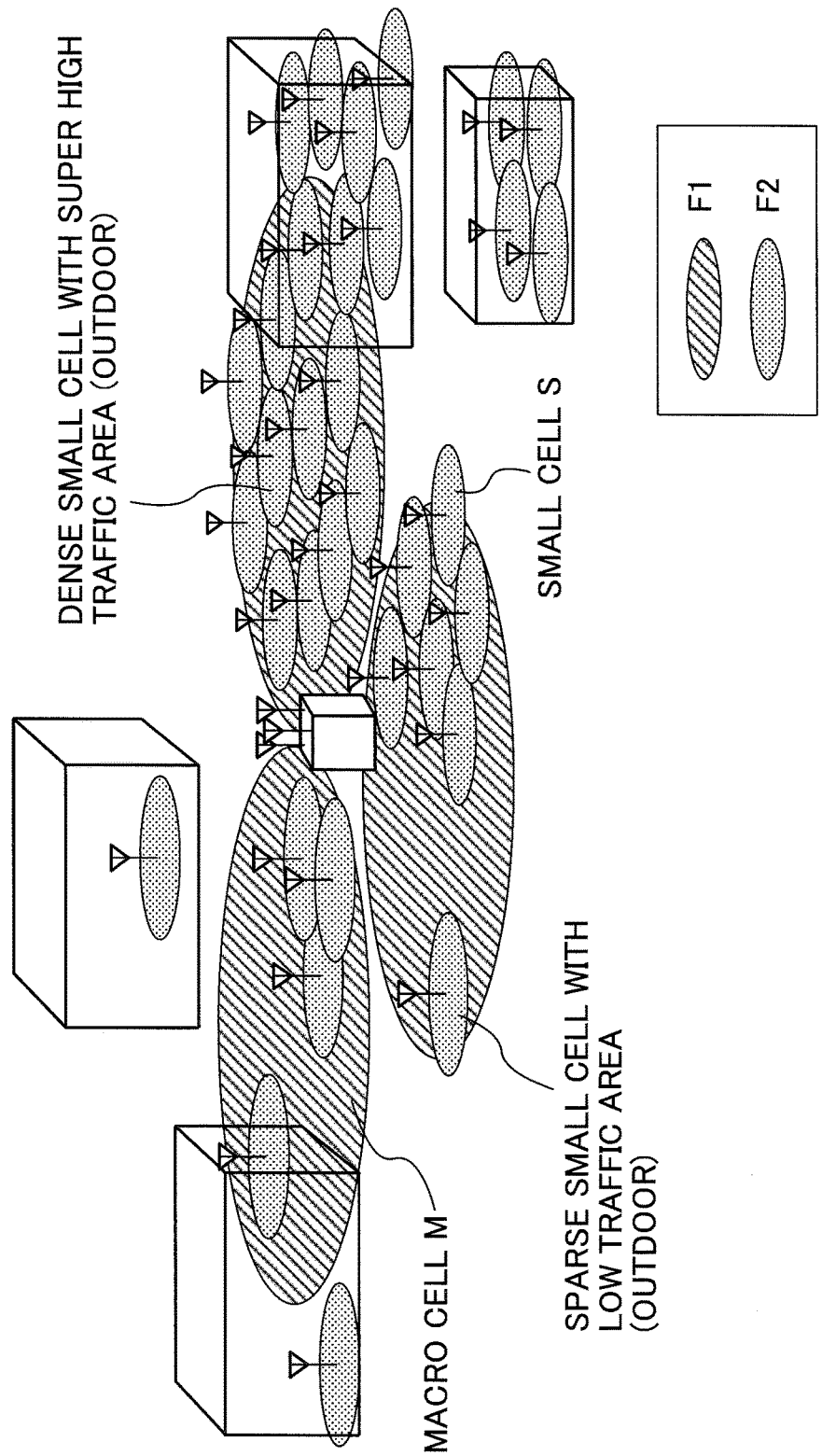
FIG. 1 is a conceptual diagram of a HetNet.

FIG. 1 is a conceptual diagram of a HetNet. As shown in FIG. 1, a HetNet refers to a radio communication system, in which a macro cell M and small cells S are placed to overlap each other geographically at least in part. Also, a HetNet is comprised of a radio base station MeNB that forms a macro cell M (hereinafter referred to as a "macro base station"), radio base stations SeNB that form small cells S (hereinafter referred to as "small base stations"), and a user terminal UE that communicates with the macro base station MeNB and the small base stations SeNB.

As shown in FIG. 1, in the macro cells M, a carrier F1 (hereinafter referred to as the "low frequency band carrier") of a relatively low frequency band such as, for example, 800 MHz or 2 GHz, is used. On the other hand, in the small cells S, which are provided in a large number, a carrier F2 (hereinafter referred to as the "high frequency band carrier") of a relatively high frequency band such as, for example, 3.5 GHz, is used. Note that 800 MHz, 2 GHz and 3.5 GHz are only examples. 3.5 GHz may be used for the carrier for the macro cell M, and 800 MHz, 2 GHz 1.7 GHz and others may be used for the carrier for the small cells S.

In this way, a scenario (separate frequencies) to employ different frequencies between small cells S and a macro cell M is under study as a radio communication system of LTE-A (Rel. 12 and later versions). In this case, it may be possible to use the macro cell M and the small cells S, which use different frequencies, simultaneously, by means of CA (carrier aggregation). Note that the present embodiment is equally applicable to radio communication systems in which the small cells S and the macro cell M use the same frequency.

Generally speaking, in radio communication systems, the distribution of users and the load of traffic are not fixed and change over time or between locations. Consequently, when many small cells S are placed in a macro cell M, the small cells may be placed in such a manner that their density and environment vary (sparse and dense) between locations, as shown in FIG. 1.

For example, in localized high-traffic areas where many user terminals gather such as train stations, shopping malls and so on, it may be possible to increase the density of placing small cells S (dense small cells). Meanwhile, in places where user terminals do not gather, it may be possible to communicate by lowering the density of placing small cells S (sparse small cells).

However, due to limitations such as the locations to install, it is not always possible to set up small cells in locations where traffic is actually heavy. That is to say, in communication systems in which small cells are placed densely, a gap may be produced between the actual distribution of small cells and the distribution of traffic, and, as a result, unevenness in traffic may be produced. Also, if unevenness in traffic is produced in predetermined areas (specific small cells), the efficiency of the use of radio resources (spectral efficiency) decreases, which makes it not possible to optimize the user throughput.

FIG. 2 shows examples of the number of user terminals connected to each of small cells S that are placed densely. FIG. 2A shows an ideal case where the number of user terminals is distributed uniformly in each small cell S. However, since the coverages of the small cells S are small, in reality, the number of user terminals in each small cell S becomes uneven due to each user terminal's movement, the conditions of communication and so on (see FIG. 2B).

Figure 3:
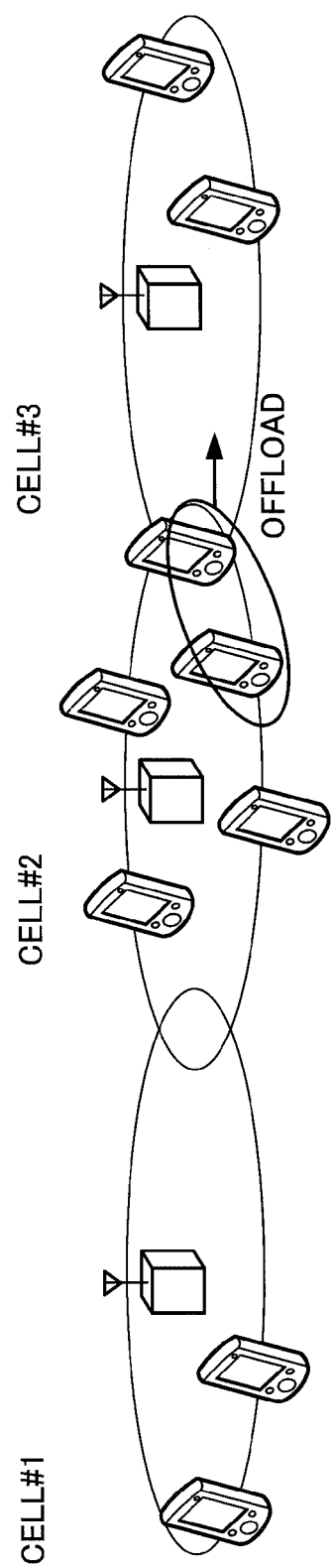
FIG. 3 is a diagram to explain the concept of load balancing.

Consequently, in an environment with uneven traffic such as this, the technique to off-load the traffic load in small cells where the traffic is heavy to nearby low-traffic areas (load balancing/shifting) is effective. For example, as shown in FIG. 3, it may be possible to connect (off-load) part of the user terminals in a small cell 2, where user terminals are concentrated, to a small cell 3, where there are a small number of user terminals. Now, a case of carrying out load balancing by taking into account the number of user terminals will be described with reference to FIG. 4.

Generally, the cell with which a user terminal connects is selected using the received power (RSRP: Reference Signal Received Power) and the received quality (RSRQ: Reference Signal Received Quality) of reference signals from each radio base station. Note that this cell selection not only refers to the selection of a cell that is carried out upon initial connection, but also covers the case where a user terminal connected to a macro base station selects the small cells to configure for carrier aggregation (CA).

For the connecting target for a user terminal, usually, the cell where the received power (RSRP) or the received quality (RSRQ) (hereinafter also referred to simply as "received power") is the highest is selected. Meanwhile, when load balancing is carried out by taking into account the unevenness of traffic, it may be possible to select a small cell where the number of user terminals is small, among small cells corresponding to received power that stays within a predetermined value (for example, X dB) from the highest received power (RSRP).

Figure 4:
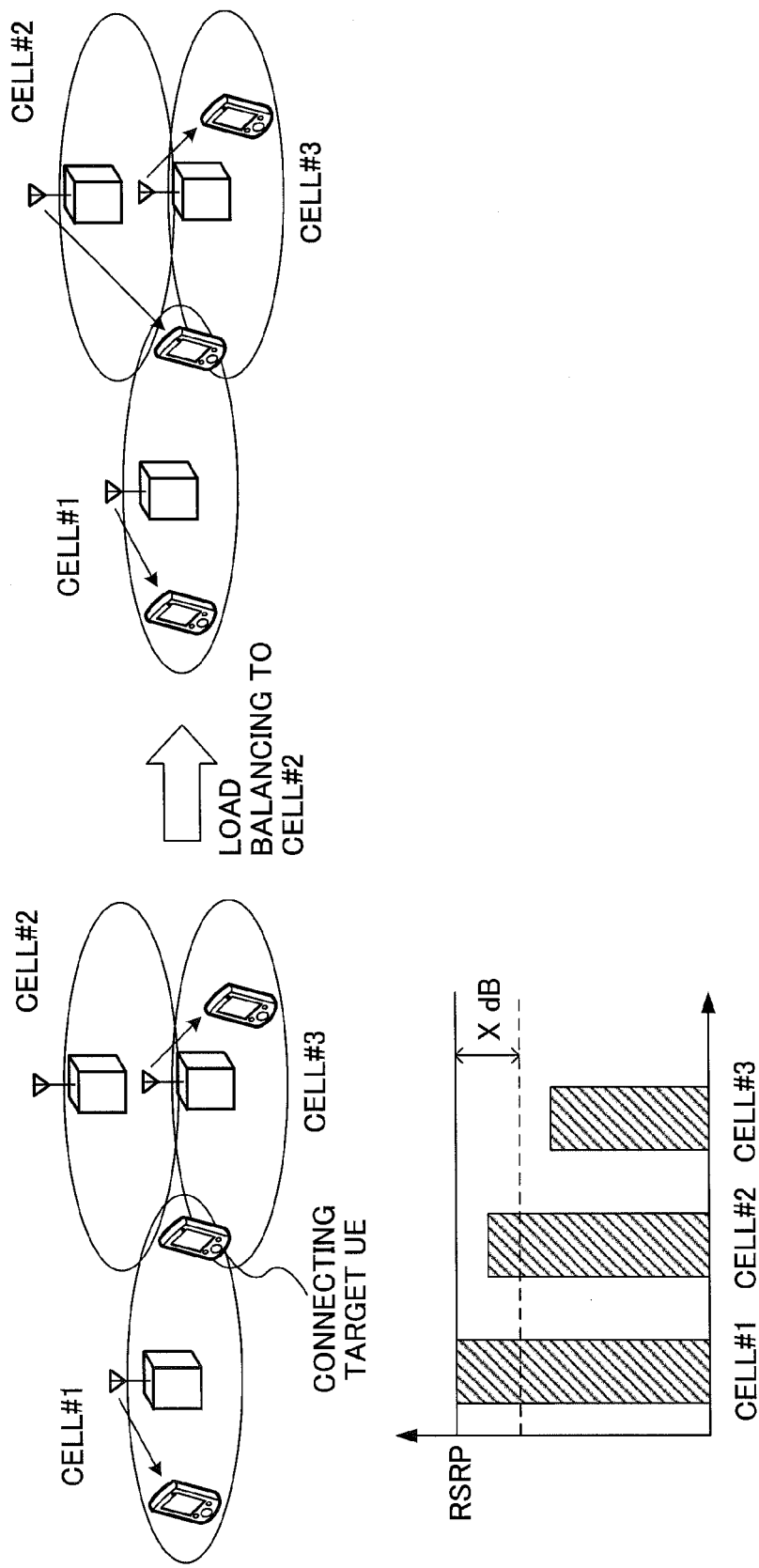
FIG. 4 is a diagram to show an example of load balancing taking into account the number of user terminals.

For example, in the case illustrated in FIG. 4, small cell #1 with the highest received power and small cell #2 with received power within X dB from the received power of small cell #1 are selected as candidate connecting cells. Then, the connecting cell is selected taking into account the numbers of user terminals connected to small cell #1 and small cell #2. Here, the number of user terminals connected to small cell #2 is small compared to small cell #1, so that small cell #2 is selected as the connecting target for the user terminal. By this means, it becomes possible to fulfill predetermined received quality, and, furthermore, distribute the number of connecting user terminals between small cells.

Figure 5:
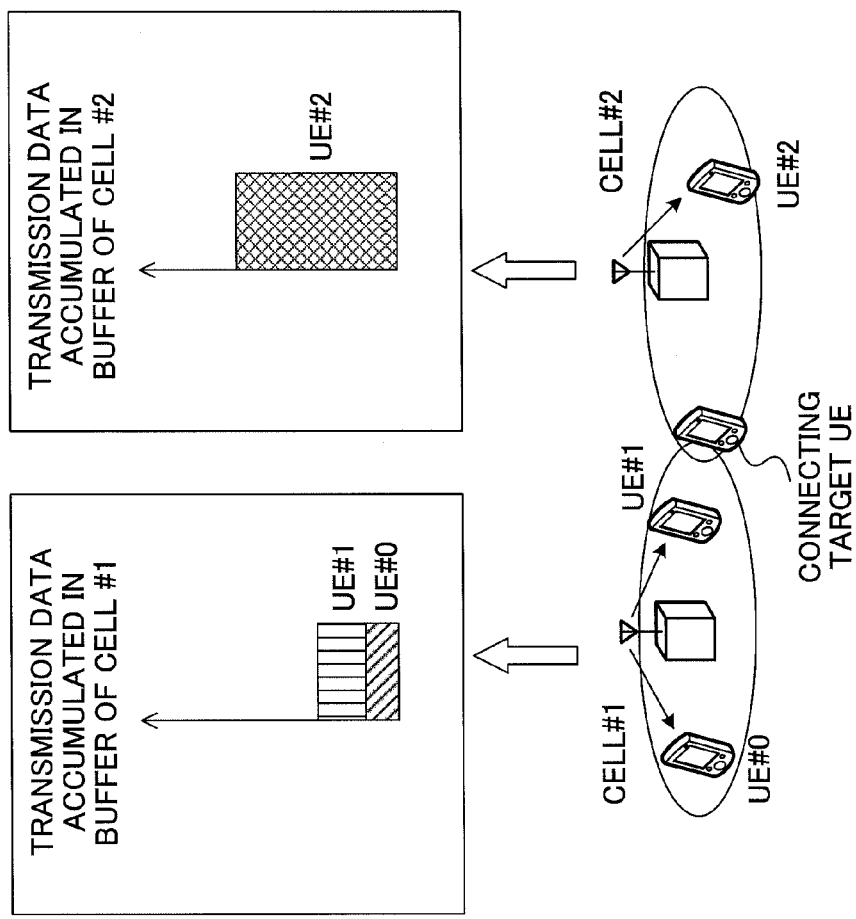
FIG. 5 is a diagram to explain a case where, when load balancing is executed taking into account the number of user terminals, the transmission data accumulated in the buffer of each cell is taken into account.

However, the present inventors have focused on the fact that the volume of traffic in reality is different from the number of user terminals, and found out that the method of making the number of user terminals even between a plurality of cells as shown in FIG. 4 above cannot make the volume of traffic sufficiently even. For example, assume a case where, as shown in FIG. 5, the number of user terminals connected to cell #1 is two (user terminals #0 and #1) and the number of user terminals connected to cell #2 is one (user terminal #2), and where a large volume of data is transmitted to user terminal #2.

In this case, if load balancing is executed based on the number of user terminals, cell #2 where the number of serving terminals is smaller is selected as the connecting cell of the user terminal. However, since the amount of data accumulated in the buffer is larger in cell #2 than in cell #1, from the perspective of making traffic even, the effect of load balancing is achieved more by connecting with cell #1 where the number of connecting user terminals is larger.

So, the present inventors have come up with the idea of carrying out load balancing by determining the connecting cell of a user terminal by taking into account the amount of data that remains in the buffer of candidate connecting cells (the amount of data to transmit to the user terminals connected to the candidate cells), instead of the number of user terminals connected to the candidate cells. Also, the present inventors have come with the idea of determining the connecting cell of a user terminal based on expected throughput that is calculated based on the SINR that takes into account the past traffic load in neighboring cells of the candidate cells, in addition to the amount of data that remains in the buffer of the candidate connecting cells.

Now, the present embodiment will be will be described in detail below with reference to the accompanying drawings.

First Example

A case will be described with a first example where the connecting cell of a user terminal is determined based on the amount of data that remains in the buffer of candidate cells with which the user terminal can connect (the amount of data to transmit to the user terminals serving under the candidate cells) will be described.

In an area where a plurality of cells (for example, small cells) are placed densely, a user terminal receives downlink signals transmitted from a plurality of cells. So, with the first example, candidate cells that can connect with the user terminal at or above predetermined received power and/or received quality are selected, and, furthermore, a cell where the amount of data that remains in the buffer is small among the candidate cells is selected as the connecting cell for the user terminal. Now, an example of the method of selecting the cell with which a user terminal connects will be described below.

Figure 6:
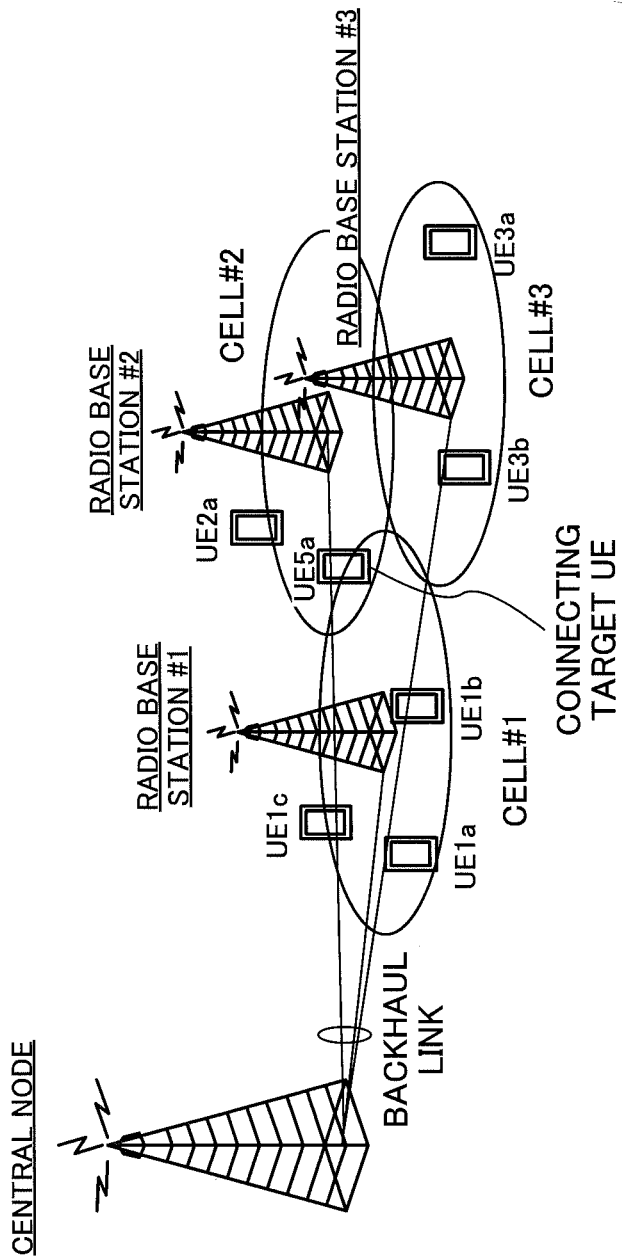
FIG. 6 is a diagram to show an example of a radio communication system according to the present embodiment.

FIG. 6 is a diagram to show an example of a radio communication system according to the present embodiment. The radio communication system of FIG. 6 includes a plurality of small base stations (here, radio base stations #1 to #3) that each form a small cell. User terminals 1a to 1c are connected to radio base station #1, a user terminal 2a is connected to radio base station #2, and user terminals 3a and 3b are connected to radio base station #3. Also, the radio communication system of FIG. 6 is comprised of a user terminal 5a, which tries to connect with one of radio base stations #1 to #3, and a central node, which determines the connecting target of the user terminal 5a.

The central node has only to be a base station to determine the connection of the user terminal 5a, and may be, for example, the macro base station in above FIG. 1, or a radio base station that controls a plurality of small base stations in a centralized manner. Radio base stations #1 to #3 and the central node are able to transmit information to each other through wire connection such as X2 signaling, optical fiber and so on, or through wireless connection.

The user terminal 5a transmits the received power (RSRP) and the received quality (RSRQ) of downlink signals (for example, downlink reference signals) transmitted from radio base stations #1 to #3, to the central node. The central node selects candidate cells where the user terminal 5a may connect, based on information regarding the received power (RSRP, RSRQ and so on) of each radio base station's cell.

For the candidate cells, cells where the received power in the user terminal 5a is equal to or greater than a predetermined value can be selected. For example, the cell with the highest received power in the user terminal 5a, and cells with received power within a predetermined value (for example, X dB) from the highest received power are selected as candidate cells. Note that the candidate cells may be determined on the user terminal side, or may be determined on the central node side where the information regarding the received power of each cell is reported from the user terminal.

Next, taking into account the frequency band that is used in each candidate cell, the central node calculates the amount of data that remains in the buffer of each candidate cell per unit frequency band. The frequency band is taken into account so as to support cases where each candidate cell uses a different frequency band (carrier, CC). Note that information regarding the amount of data that remains in the buffer of each candidate cell can be reported from each candidate cell to the central node.

Also, the total amount of data that remains in the buffer is equivalent to the amount of data which each candidate cell transmits to the serving user terminals. The total amount of data in the buffer may be an instantaneous, value, or may be the average value over a predetermined period.

The central node determines a candidate cell with a small amount of data as the connecting cell for the user terminal 5a. Also, by checking the amount of data in a candidate cell of high received power, if the amount of data is smaller than a predetermined value (for example, the average value of the total amount of data in each radio base station), this candidate cell may be determined as the connecting cell of the user terminal 5a, or, if the amount of data is greater, the same operation may be repeated with the candidate cell of the next highest received power. Furthermore, if the above operation is repeated and yet a candidate cell is not found, the candidate cell of the highest received power may be determined as the connecting cell of the user terminal 5a. For example, the central node can calculate the amount of data in each candidate cell by using following equation 1:

$$\text{Buffer}_{cell} = \frac{1}{BW_{cell}}(\text{Data}_{cell\_UE\#0} + \text{Data}_{cell\_UE\#1} + \ldots) \quad \text{(Equation 1)}$$

where $BW_{cell}$: the frequency band used in each candidate cell (this may be the number of carriers or RBs); and $\text{Data}_{cell\_UE\#i}$: the amount of data to transmit to serving user terminal #i (i=1, 2, . . . ).

In this way, according to the first example, load balancing is executed by taking into account the amount of data that remains in the buffer of each candidate cell per unit frequency band, instead of the number of user terminals connected to each candidate cell. Consequently, referring to FIG. 6, although, when load balancing is executed based on the number of user terminals as heretofore, cell #2 where the number of connecting user terminals is small is selected as the connecting cell of a user terminal, with the present embodiment, this is determined by taking into account the amount of data in each cell's buffer. By this means, even when a plurality of small cells are placed densely, it is still possible to use radio resources effectively and improve the throughput of the radio communication system.

<When a Plurality of CCs are Employed>

Next, an example of the method of determining the cell and the CC where a user terminal connects when a plurality of component carriers (CCs) are used in each cell will be described. Note that the following description assume a case where radio base stations #1 to #3 in FIG. 6 each use a plurality of CCs (for example, three CCs). Obviously, the present embodiment is by no means limited to this.

When a plurality of CCs are used in each candidate cell and furthermore an optimal connecting cell for a user terminal is selected on a per CC basis (inter-base station CA), the central node calculates the amount of data that remains in the buffer of each candidate cell per unit frequency band, on a per CC basis. By this means, the central node can determine an optimal cell with which the user terminal 5a connects, on a per CC basis, based on the amount of data in candidate cells in each CC.

To be more specific, the central node calculates the amount of data, on a per CC basis, for candidate cells, the received power of which in the user terminal is equal to or greater than a predetermined value. To be more specific, the central node can calculate the amount of data in each candidate cell, on a per CC basis, by using following equation 2. For example, when the number of CCs is three (CC1 to CC3), for each of CC1 to CC3, the central node calculates the amount of data per unit frequency band, with respect to the amount of data that remains in the buffer of each candidate cell. Note that a case is assumed here where the CCs used in each cell are the same channel.

$$\text{Buffer}_{cell\_cc} = \frac{(\text{Data}_{cell\_cc\_UE\#0} + \text{Data}_{cell\_cc\_UE\#1} + \dots)}{BW_{cell\_cc}} \quad \text{(Equation 2)}$$

Using the amount of data that remains in the buffer of each candidate cell, calculated on a per CC basis using above equation 2, the central node determines the candidate cell to have the smallest amount of data in each CC as the connecting cell of the user terminal 5a. Also, in each CC, the central node may check the amount of data in a candidate cell of high received power, and, if the amount of data is smaller than a predetermined value (for example, the average value of the total amount of data in each radio base station), determine this candidate cell as the connecting cell of the user terminal 5a, or, if the amount of data is greater, repeat the same operation with the candidate cell of the next highest received power. Furthermore, if the above operation is repeated and yet a candidate cell is not found, the candidate cell of the highest received power may be determined as the connecting cell of the user terminal 5a in that CC. By this means, the central node can determine an optimal cell for the user terminal to connect with, on a per CC basis, by taking into account the amount of data that remains in the buffer of the candidate connecting cells, instead of the number of user terminals connected to the candidate cells.

On the other hand, when a plurality of CCs are used in each candidate cell and furthermore a scheduler that is shared between CCs is used (intra-base station CA), the central node can determine the candidate cell where the total value of the amount of data remaining in the buffer of the candidate cell in each CC is the smallest, as the connecting cell of the user terminal 5a. Note that, in this case, the amount of data in the buffer is added up for the number of CCs ($CC_u$) which the user terminal 5a supports.

For example, when the number of CCs the user terminal 5a supports (for example, $CC_u=2$) is smaller than the number of CCs employed in each candidate cell (for example, $CC_{cell}=3$) ($CC_u<CC_{cell}$), the central node adds up the amount of data in the buffers in $CC_{cell}$ based on $CC_u$. To be more specific, the central node finds the total of the amount of data in buffers (here, the total of two CCs) for the possible combinations, by using following equation 3. Note that, when $CC_u=2$ and $CC_{cell}=3$, there are three patterns ($=_3C_2$).

$$\begin{aligned}\text{Buffer}_{cell} &= \text{Buffer}_{cell\_cc\#0} + \text{Buffer}_{cell\_cc\#1} + \dots \quad \text{(Equation 3)}\\ &= \frac{(\text{Data}_{cell\_cc\#0\_UE\#0} + \text{Data}_{cell\_cc\#0\_UE\#1} + \dots)}{BW_{cell\_cc\#0}} + \\ &\quad \frac{(\text{Data}_{cell\_cc\#1\_UE\#0} + \text{Data}_{cell\_cc\#1\_UE\#1} + \dots)}{BW_{cell\_cc\#1}} + \\ &\quad \dots\end{aligned}$$

The central node takes into account CC1+CC2, CC1+CC3 and CC2+CC3 as the amount of data that remains in the buffer of each candidate cell. Then, the candidate cell where the total value of two CCs is the smallest can be determined as the cell with which the user terminal 5a connects.

In this way, by calculating the total value of the amount of data that remains in the buffer of each cell taking into account the relationship between the number of CCs the user terminal supports and the CCs used in each cell, it is possible to determine an optimal connecting cell for the user terminal.

Second Example

A case will be described with a second example where a user terminal calculates the expected throughput of candidate cells, with which the user terminal can connect, and determines the small cell (or carrier), with which the user terminal connects, such that the expected throughput becomes the maximum will be described.

As described earlier, in an area where a plurality of cells (for example, small cells) are placed densely, a user terminal receives signals transmitted from a plurality of cells (candidate cells). So, with the second example, the SINR of each candidate cell is calculated by using the received power (RSRP) and the received quality (RSRQ) (hereinafter also referred to simply as "received power") of each candidate cell in the user terminal. Also, the calculation of the SINR takes into account the traffic load in cells other than each candidate cell (cells that neighbor the candidate cell of interest).

Then, the expected throughput of each candidate cell is calculated from each candidate cell's SINR, and, furthermore, expected throughput to take into account the amount of data that remains in the buffer of each candidate cell is calculated, and the cell with which the user terminal connects is determined. Now, an example of the method of selecting the cell with which a user terminal connects will be described below.

Figure 7A:
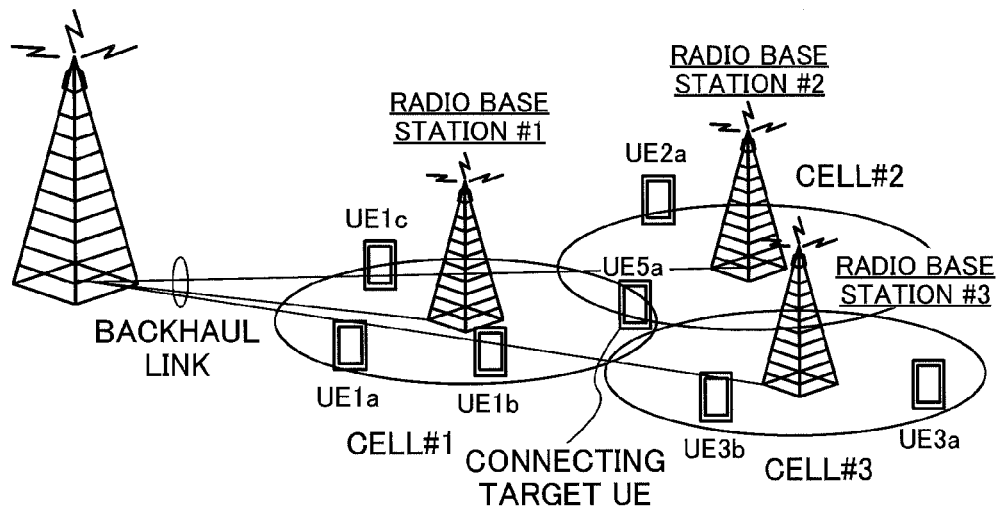
FIG. 7 is a sequence diagram to show an example of the steps of load balancing according to the present embodiment.
Figure 7B:
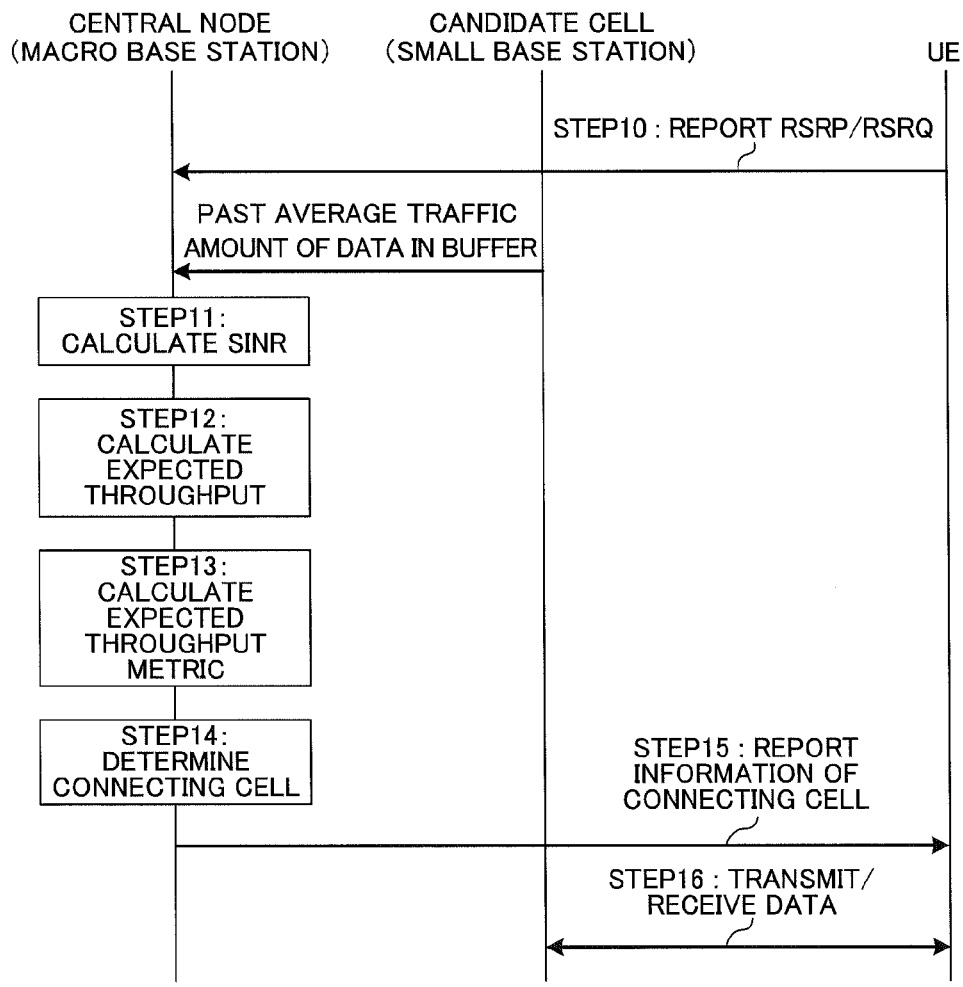

FIG. 7A is a diagram to show an example of a radio communication system according to the present embodiment. The radio communication system of FIG. 7A has the same structure as that of the radio communication system shown in above FIG. 6, and therefore description will be omitted. Now, an example of the steps in which the central node determines the connecting cell of the user terminal 5a will be described below with reference to FIG. 7B.

First, the user terminal 5a transmits information regarding the received power (RSRP, RSRQ and so on) of downlink signals (for example, downlink reference signals) transmitted from radio base stations #1 to #3, which form candidate cells, to the central node (step 10). Also, information regarding the traffic load that has been observed in each cell in the past, the amount of data that remains in the buffer of each candidate cell (the amount of data to transmit to the user terminals serving under each candidate cell) and so on may be reported from each candidate cell to the central node.

As for the candidate cells, it is possible to select all the cells from which the user terminal 5a can receive downlink signals, or, as in the above first example, select cells, the received power of which in the user terminal 5a is equal to or greater than a predetermined value. Note that the candidate cells may be determined on the user terminal side, or may be determined on the central node side where the information regarding the received power of each cell is reported from the user terminal.

The central node calculates the SINR of each candidate cell based on the information received from the user terminal 5a and each candidate cell (step 11). At this time, when calculating a given candidate cell's SINR, this is calculated by taking into account the traffic load in candidate cells (neighboring cells) other than the candidate cell of interest. For example, when calculating the SINR of candidate cell #1 formed by radio base station #1, the average traffic load that has been observed in the past in candidate cell #2 formed by radio base station #2 and candidate cell #3 formed by radio base station #3 is taken into account.

The central node can calculate the SINR of each candidate cell by using following equation 4:

$$SINR_{cell} = \frac{RSRP_{cell}}{\alpha_1 RSRP_{Neighbor1} + \alpha_2 RSRP_{Neighbor2} + \ldots} \quad \text{(Equation 4)}$$

where

α: the average traffic load that has been observed in the past in each candidate cell.

For example, when calculating the SINR of candidate cell #1, the received power of this candidate cell #1 ($RSRP_{cell}$), the received power of the other candidate cells #2 and #3 ($RSRP_{Neighbor1}$ and $P_{Neighbor2}$) and the past traffic load in the other candidate cells #2 and #3 ($\alpha_1$ and $\alpha_2$) are used.

Note that, in equation 4, α (here, $\alpha_1$ and $\alpha_2$), which represents the past average traffic load in the other candidate cells, is not particularly limited, as long as it is a value to represent the relative relationship between other candidate cells in terms of traffic. For example, assuming that the total amount of past average traffic load in the other candidate cells (neighboring cells) is 1, the central node can determine α (0 to 1) in accordance with the value of traffic load in the candidate cell. Note that the average traffic load observed in the past may be the average value of traffic load in each candidate cell over a predetermined period in the past.

Next, based on the SINR determined in step 11, the central node calculates the expected throughput of each candidate cell (step 12). For example, the expected throughput is calculated based on the SINR and the candidate cell's frequency band (BW). To be more specific, the central node can calculate each candidate cell's expected throughput by using following equation 5:

$$R_{cell} = BW_{cell} \log_2(1 + SINR_{cell}) \quad \text{(Equation 5)}$$

where $BW_{cell}$: the frequency band (which may also be the number of carriers or RBs) used in each candidate cell.

Next, using the expected throughput determined in step 12, the central node calculates an expected throughput (hereinafter also referred to as "expected throughput metric") that takes into account the total amount of data that remains in the buffer of each candidate cell (step 13). Also, the total amount of data that remains in the buffer is equivalent to the amount of data which each candidate cell transmits to the serving user terminals. The total amount of data in the buffer may be an instantaneous value, or may be the average value over a predetermined period.

The central node can calculate a metric of the throughput of each candidate cell by using following equation 6:

$$\text{Metric}_{cell} = \frac{\beta_{cell}}{\text{Data}_{cell\_UE\#0} + \text{Data}_{cell\_UE\#1} + \ldots + \gamma_{cell}} R_{cell} \quad \text{(Equation 6)}$$

where $\text{Data}_{cell\_UE\#i}$: the amount of data to transmit to serving user terminal #i (i=1, 2, ...); and $\beta_{cell}, \gamma_{cell}$: correction terms.

For example, when calculating the SINR of candidate cell #1, the amount of data ($\text{Data}_{cell\_UE\#1a}$, $\text{Data}_{cell\_UE\#1b}$ and $\text{Data}_{cell\_UE\#1c}$) to be transmitted to the serving user terminals 1a to 1c under this candidate cell #1 is taken into account. A cell in which the value of the expected throughput metric of above equation 6, which takes into account the amount of data to transmit, is greater is more likely to be a cell, in which the actual volume of traffic is low and with which the user terminal can connect at predetermined received quality.

Also, in above equation 6, if the correction terms are $\beta_{cell}=1$ and $\gamma_{cell}=0$, the term $\beta_{cell}/(\text{Data}_{cell\_UE\#0} + \text{Data}_{cell\_UE\#1} + \ldots + \gamma_{cell})$ may assume values ranging from 0 to infinity, so that, in the cell selection using above equation 6, the amount of data to transmit has a more dominant impact than the expected throughput $R_{cell}$. On the other hand, if the correction terms are $\beta_{cell}=1$ and $\gamma_{cell}=1$, the term $\beta_{cell}/(\text{Data}_{cell\_UE\#0} + \text{Data}_{cell\_UE\#1} + \ldots + \gamma_{cell})$, may assume values ranging from 0 to 1, so that, in the cell selection using above equation 6, the expected throughput $R_{cell}$ has a more dominant impact than the amount of data to transmit.

After having calculated the expected throughput metric of each candidate cell by using above equation 6, the central node determines a candidate cell where the expected throughput metric is large as the connecting cell of the user terminal 5a (step 14). After that, the central node reports information regarding the connecting cell to the user terminal 5a by using higher layer signaling (for example, RRC signaling) and so on (step 15), and communication starts between the user terminal 5a and the connecting cell (step 16).

In this way, by executing load balancing by using expected throughput that takes into account the amount of data that remains in the buffer of candidate cells, instead of the number of user terminals connected to the candidate cells, it is possible to use radio resources effectively and improve the throughput of the radio communication system even when a plurality of small cells are placed densely.

<When a Plurality of CCs are Employed>

Next, an example of the method of determining the cell with which a user terminal connects when a plurality of component carriers (CCs) are used in each cell will be described. Note that the following description will assume a case where radio base stations #1 to #3 in FIG. 7A each use a plurality of CCs (for example, three CCs). Obviously the present embodiment is by no means limited to this.

When plurality of CCs are used in each candidate cell and furthermore an optimal connecting cell for a user terminal is selected on a per CC basis (inter-base station CA), the central node calculates the expected throughput of each candidate cell on a per CC basis. Then, the central node calculates an expected throughput metric, which takes into account the total amount of data that remains in the buffer of the candidate cells in each CC. By calculating an expected throughput metric of each candidate cell for each CC, the central node can determine an optimal cell for the user terminal to connect with, on a per CC basis.

To be more specific, the central node calculates the SINR of each candidate cell, on a per CC basis, based on information received from the user terminal and each candidate cell. At this time, for candidate cells other than the above cell where the SINR is calculated, the central node carries out the calculation by taking into account the traffic load.

The central node can calculate the SINR of each candidate cell, on a per CC basis, using following equation 7. For example, when the number of CCs is three (CC1 to CC3), the SINR of each candidate cell is calculated in each of CC1 to CC3. Note that a case is assumed here where the CCs used in each cell are the same channel.

$$SINR_{cell\_cc} = \frac{RSRP_{cell\_cc}}{\alpha_{1\_cc}RSRP_{Neighbor1\_cc} + \alpha_{2\_cc}RSRP_{Neighbor2\_cc} + \ldots} \quad \text{(Equation 7)}$$

where

α: the average traffic load observed in the past in each candidate cell; and

CC: component carrier index.

Next, the central node calculates the expected throughput of each candidate cell separately, on a per CC basis, by using the SINRs determined in above equation 7. At this time, the frequency band (or the number of RBs) to use in each CC is taken into account. To be more specific, the central node can calculate each candidate cell's expected throughput on a per CC basis using following equation 8. For example, when the number of CCs is three (CC1 to CC3), each candidate cell's expected throughput is calculated in each of CC1 to CC3.

$$R_{cell\_cc} = BW_{cc} \log_2(1 + SINR_{cell\_cc}) \quad \text{(Equation 8)}$$

where $BW_{CC}$: the frequency band that is used in each cell (which may also be the number of carriers or RBs).

Next, using the expected throughput determined in above equation 8, the central node calculates an expected throughput metric that takes into account the total amount of data that remains in the buffer of each candidate cell, on a per CC basis. To be more specific, the central node can calculate each candidate cell's expected throughput metric, on a per CC basis, using following equation 9. For example, when the number of CCs is three (CC1 to CC3), each candidate cell's expected throughput metric in each of CC1 to CC3.

$$\text{Metric}_{cell\_cc} = \frac{\beta_{cell\_cc}}{\text{Data}_{cell\_cc\_UE\#0} + \text{Data}_{cell\_cc\_UE\#1} + \ldots + \gamma_{cell\_cc}} R_{cell\_cc} \quad \text{(Equation 9)}$$

where $\text{Data}_{cell\_cc\_UE\#i}$: the amount of data to transmit to serving user terminal #i (i=1, 2, . . . ) in each CC; and $\beta_{cell\_cc}$, $\gamma_{cell\_cc}$: correction terms.

The central node calculates each candidate cell's expected throughput metric, on a per CC basis, using above equation 9, and determine the candidate cell where the expected throughput metric is the largest in each CC as the connecting cell of the user terminal 5a. By this means, the central node can determine an optimal cell for the user terminal to connect with, on a per CC basis, based on expected throughput that takes into account the amount of data that remains in the buffer of the candidate connecting cells, instead of the number of user terminals connected to the candidate cells.

On the other hand, when a plurality of CCs are used in each candidate cell and a scheduler that is common between CCs is used (intra-base station CA), the central node can determine the candidate cell, in which the total value of the expected throughput metric in each CC is the highest, as the connecting cell of the user terminal 5a. In this case, the expected throughput metric is added up for the number of CCs ($CC_u$) which the user terminal 5a supports.

For example, when the number of CCs which the user terminal 5a supports (for example, $CC_u=2$) is smaller than the number of CCs employed in each candidate cell (for example, $CC_{cell}=3$) ($CC_u < CC_{cell}$), the central node adds up the expected throughput metrics in $CC_{cell}$ based on $CC_u$. To be more specific, the central node finds the total of expected throughput metrics (here, the total of two CCs) for the possible combinations, by using following equation 10. Note that, when $CC_u=2$ and $CC_{cell}=3$, there are three patterns ($=_3C_2$).

$$\text{Metric}_{cell} = \sum_{cc=0}^{CC_u} \frac{\beta_{cell\_cc}}{\text{Data}_{cell\_cc\_UE\#0} + \text{Data}_{cell\_cc\_UE\#1} + \ldots + \gamma_{cell\_cc}} R_{cell\_cc} \quad \text{(Equation 10)}$$

where $\text{Data}_{cell\_cc\_UE\#i}$: the amount of data to transmit to serving user terminal #i (i=1, 2, . . . ) in each CC; and $\beta_{cell\_cc}$, $\gamma_{cell\_cc}$: correction terms.

The central node takes into account CC1+CC2, CC1+CC3, CC2+CC3 as each candidate cell's expected throughput metric. Then, the central node can determine the candidate cell where the total value of two CCs is the highest as the cell with which the user terminal 5a connects.

In this way, by calculating the total value of each candidate cell's expected throughput metric by taking into account the relationship between the number of CCs which the user terminal supports and the CCs used in each cell, it is possible to determine an optimal connecting cell for the user terminal.

<Variation>

Note that one characteristic of the present embodiment is that the frequency of assigning each cell, CC and so on is taken into account as a basis upon selecting the cell with which the user terminal 5a connects. Consequently, although cases have been shown in the above description where each candidate cell's expected throughput is normalized by the amount of data that remains in the buffer of each radio base station, the present embodiment is by no means limited to this.

For example, the expected throughput metric in each candidate cell may be defined as shown in following equation 11 and equation 12. Note that equation 11 is equivalent to an equation which generalizes above equation (6), and equation 12 is equivalent to an equation which generalizes above equation 9 and equation 10. That is, equation 6, equation 9 and equation 10 are equivalent to cases where, in equation 11 and equation 12, $\chi_{cell}=1/$(the amount of data).

$$\text{Metric}_{cell} = \chi_{cell} R_{cell} \quad \text{(Equation 11)}$$

$$\text{Metric}_{cell\_cc} = \chi_{cell\_cc} R_{cell\_cc} \quad \text{(Equation 12)}$$

As for $\chi_{cell}$, besides "1/the amount of data," it is possible to use "the value which averages the frequency of assignment (which may also be, for example, the rate of the use of resources) over a predetermined period when there is data in the buffer of the candidate cell or CC," "1/(the number of user terminals (the number of UEs) to have data in the buffer upon cell selection or over a predetermined period)," "the average UE throughput in the cell," and so on. Note that, as for the average UE throughput, it is possible to approximate the instantaneous throughput of the user u with following equation 13, and make this approximated value the average value.

$$\text{UE throughput} = BW_u \log_2(1+CQI_{cell\_u}) \qquad \text{(Equation 13)}$$

where $BW_u$: the number of RBs actually allocated to the user terminal.

Note that, not only in the second example, but also in the first example as well, it is possible to determine the connecting cell of a user terminal by taking into account "the value which averages the frequency of assignment (which may also be, for example, the rate of the use of resources) over a predetermined period when there is data in the buffer of the candidate cell or CC," "1/(the number of user terminals (the number of UEs) to have data in the buffer upon cell selection or over a predetermined period)," "the average UE throughput in the cell," and so on, instead of the amount of data that remains in the buffer of radio base stations.

(Structure of Radio Communication System)

Now, an example of a radio communication system according to the present embodiment will be described in detail below. In this radio communication system, the above-described methods of determining the connecting cell of a user terminal according to the first and second examples are employed.

Figure 8:
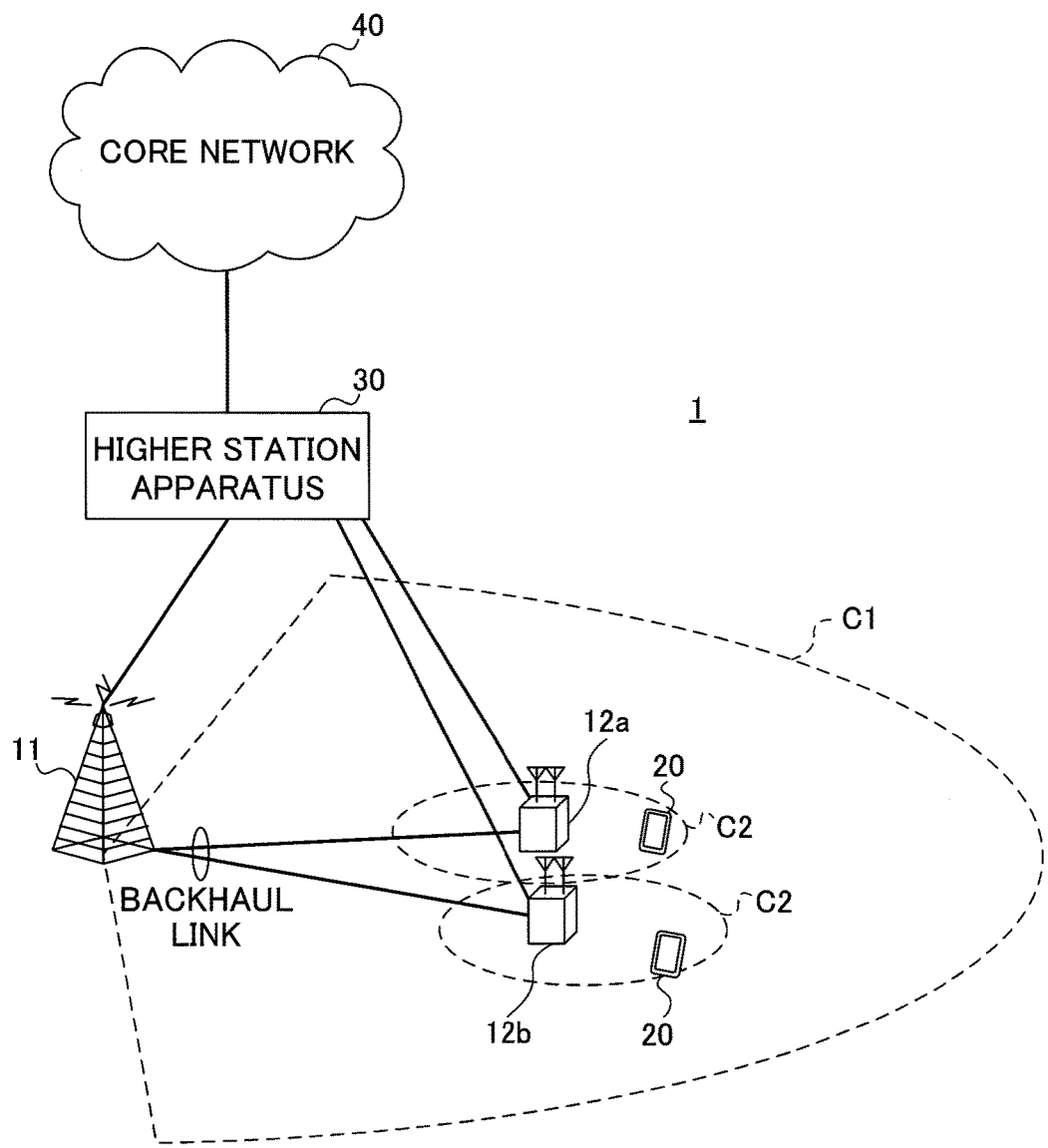
FIG. 8 is a schematic diagram to show an example of a radio communication system according to the present embodiment.

FIG. 8 is a schematic configuration diagram of a radio communication system according to the present embodiment. Note that the radio communication system shown in FIG. 8 is a system to accommodate, for example, the LTE system or SUPER 3G. This radio communication system can adopt carrier aggregation (CA) to group a plurality of fundamental frequency blocks (component carriers) into one, where the system bandwidth of the LTE system constitutes one unit. Also, this radio communication system may be referred to as "IMT-advanced," or may be referred to as "4G" or "FRA (Future Radio Access)."

The radio communication system 1 shown in FIG. 8 includes a radio base station 11 that forms a macro cell C1, and radio base stations 12a and 12b that form small cells C2, which are placed in the macro cell C1, and which are narrower than the macro cell C1. Also, in the macro cell C1 and in each small cell C2, user terminals 20 are placed. The user terminals 20 can connect with both the radio base station 11 and the radio base stations 12 (dual connectivity). In this case, the user terminals 20 may use the macro cell C1 and the small cells C2, which use different frequencies, at the same time, by means of CA (carrier aggregation).

Between the user terminals 20 and the radio base station 11, communication is carried out using a carrier of a relatively low frequency band (for example, 2 GHz) and a narrow bandwidth (referred to as "existing carrier," "legacy carrier" and so on). Meanwhile, between the user terminals 20 and the radio base stations 12, a carrier of a relatively high frequency band (for example, 3.5 GHz, etc.) and a wide bandwidth may be used, or the same carrier as that used in the radio base station 11 may be used. For the carrier type between the user terminals 20 and the radio base stations 12, a new carrier type (NCT) may be used. The connection between the radio base station 11 and the radio base stations 12 (or between the radio base stations 12) is implemented by wire connection (optical fiber, the X2 interface and so on) or by wireless connection.

The radio base station 11 and the radio base stations 12 are each connected with a higher station apparatus 30, and connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, the radio base station 12 may be each connected with the higher station apparatus via the radio base station 11.

Note that the radio base station 11 is a radio base station having a relatively wide coverage, and may be referred to as an "eNodeB," a "macro base station," a "central node," a "transmitting/receiving point" and so on. Also, the radio base stations 12 are radio base stations having local coverages, and may be referred to as "small base stations," "pico base stations," "femto base stations," "Home eNodeBs," "RRHs (Remote Radio Heads)," "micro base stations," "transmitting/receiving points" and so on. Also, when no distinction is made between the radio base stations 11 and 12, these will be collectively referred to as the "radio base station 10." The user terminals 20 are terminals to support various communication schemes such as LTE, LTE-A and so on, and may include both mobile communication terminals and fixed communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing the system band into bands formed with one or continuous resource blocks, per terminal, and allowing a plurality of terminals to use mutually different bands.

Now, communication channels to be used in the radio communication system shown in FIG. 8 will be described. Downlink communication channels include a PDSCH (Physical Downlink Shared Channel), which is used by each user terminal 20 on a shared basis, and downlink L1/L2 control channels (a PDCCH, a PCFICH, a PHICH and an enhanced PDCCH). User data and higher control information are transmitted by the PDSCH. Scheduling information for the PDSCH and the PUSCH and so on are transmitted by the PDCCH (Physical Downlink Control Channel). The number of OFDM symbols to use for the PDCCH is transmitted by the PCFICH (Physical Control Format Indicator CHannel). HARQ ACKs/NACKs in response to the PUSCH are transmitted by the PHICH (Physical Hybrid-ARQ Indicator CHannel). Also, the scheduling information for the PDSCH and the PUSCH and so on may be transmitted by the enhanced PDCCH (EPDCCH) as well. This EPDCCH is frequency-division-multiplexed with the PDSCH (downlink shared data channel).

Uplink communication channels include a PUSCH (Physical Uplink Shared Channel), which is used by each user terminal 20 on a shared basis as an uplink data channel, and a PUCCH (Physical Uplink Control Channel), which is an uplink control channel. User data and higher control information are transmitted by this PUSCH. Also, downlink radio quality information (CQI: Channel Quality Indicator), ACKs/NACKs and so on are transmitted by the PUCCH.

Figure 9:
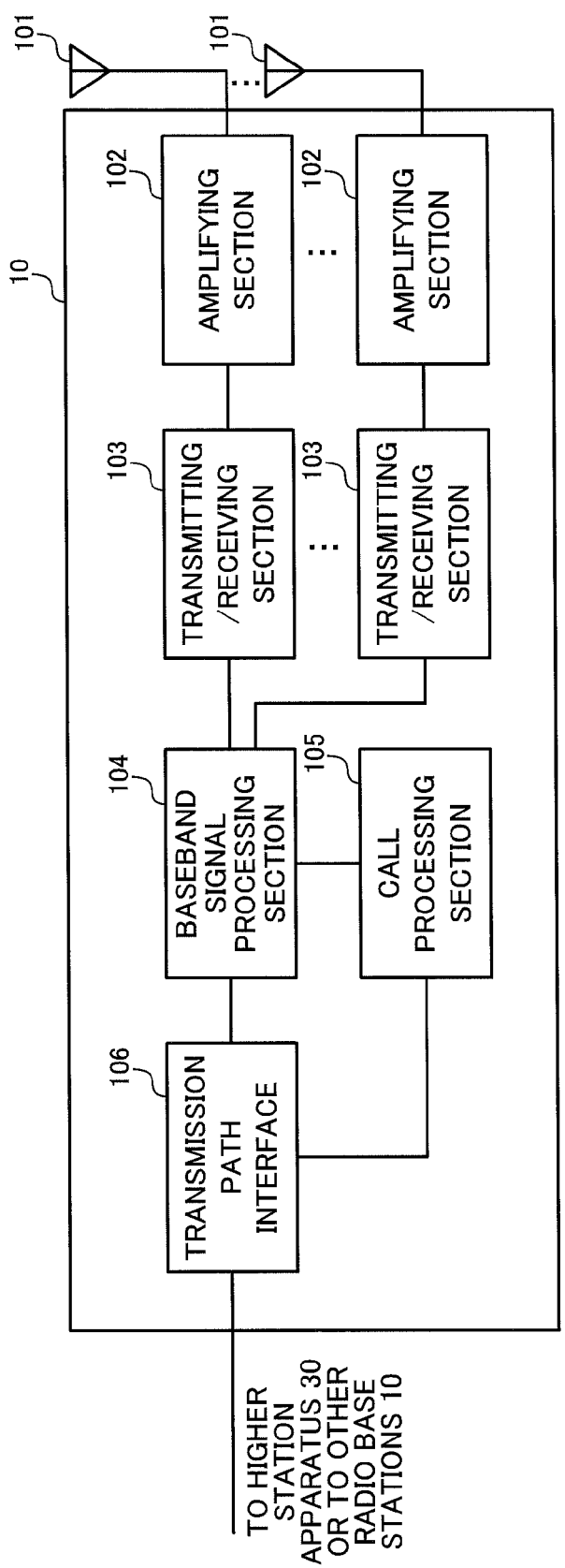
FIG. 9 is a diagram to explain an overall structure of a radio base station according to the present embodiment.

FIG. 9 is a diagram to show an overall structure of a radio base station 10 (which covers the radio base stations 11 and 12) according to the present embodiment. The radio base station 10 has a plurality of transmitting/receiving antennas 101 for MIMO transmission, amplifying sections 102, transmitting/receiving sections 103, a baseband signal processing section 104, a call processing section 105 and a transmission path interface 106.

User data to be transmitted from the radio base station 10 to a user terminal 20 on the downlink is input from the higher station apparatus 30, into the baseband signal processing section 104, via the transmission path interface 106:

In the baseband signal processing section 104, a PDCP layer process, division and coupling of the user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a pre-coding process are performed, and the result is transferred to each transmitting/receiving section 103. Furthermore, downlink control channel signals are also subjected to transmission processes such as channel coding and an inverse fast Fourier transform, and are transferred to each transmitting/receiving section 103.

Also, the baseband signal processing section 104 reports control information for allowing communication in the cell to the user terminal 20, through a broadcast channel. The information for allowing communication in the cell includes, for example, the uplink or downlink system bandwidth and so on. Also, when the user terminal is connected with both the radio base station 11 and the radio base stations 12 (dual connection), it is possible to report information regarding the connecting cell from the radio base station 11, which functions as the central node, to the user terminal, via higher layer signaling.

Each transmitting/receiving section 103 converts the baseband signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

On the other hand, as for data that is transmitted from the user terminal 20 to the radio base station 10 on the uplink, radio frequency signals that are received in the transmitting/receiving antennas 101 are each amplified in the amplifying sections 102, converted into baseband signals through frequency conversion in each transmitting/receiving section 103, and input into the baseband signal processing section 104.

In the baseband signal processing section 104, the user data that is included in the input baseband signals is subjected to an FFT process, an IDFT process, error correction decoding, a MAC retransmission control receiving process and RLC layer and PDCP layer receiving processes, and the result is transferred to the higher station apparatus 30 via the transmission path interface 106. The call processing section 105 performs call processing such as setting up and releasing communication channels, manages the state of the radio base station 10 and manages the radio resources.

Figure 10:
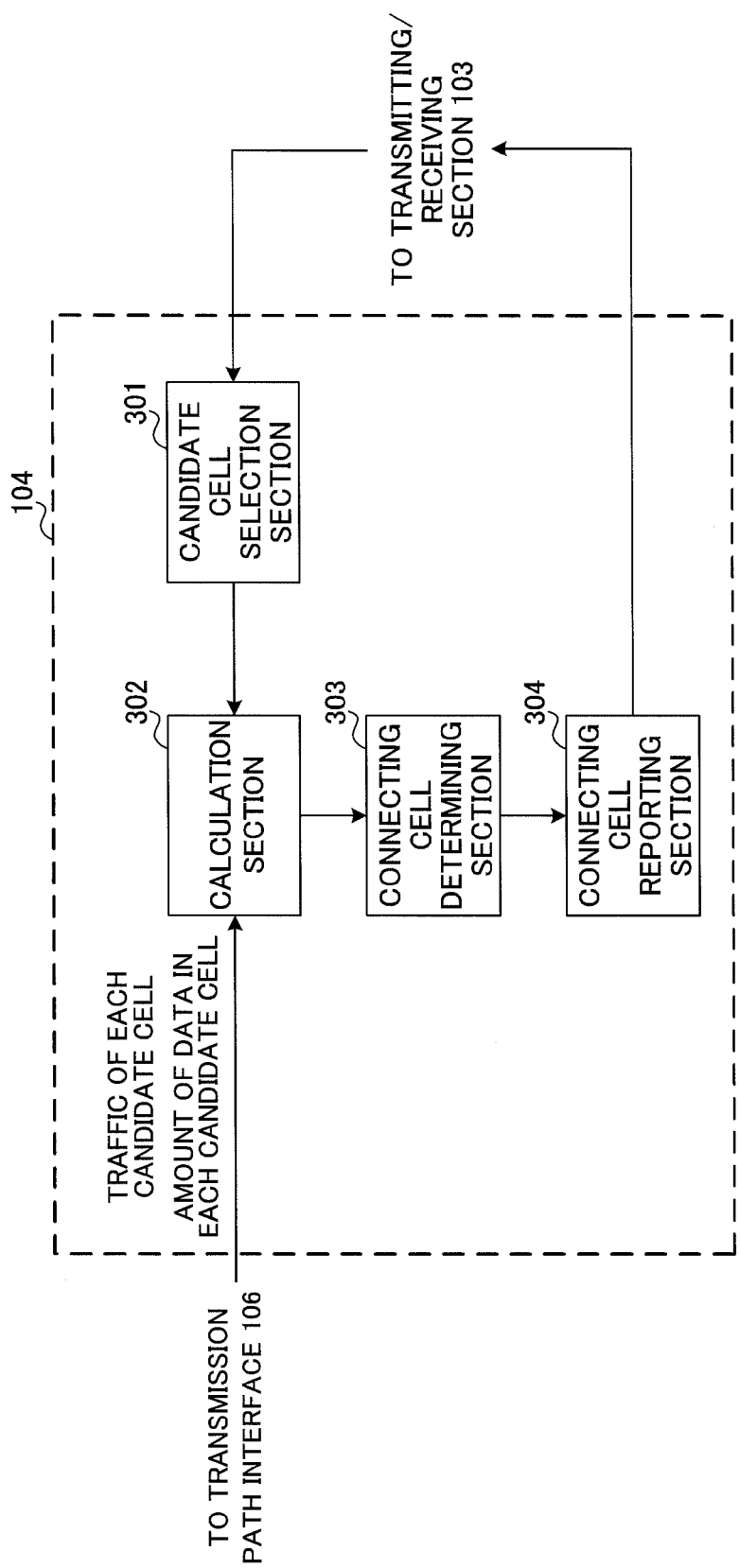
FIG. 10 is a diagram to explain a functional structure of a radio base station according to the present embodiment.

FIG. 10 is a diagram to show a principle functional structure of the baseband signal processing section 104 provided in a radio base station 10 (macro base station or central node) according to the present embodiment.

As shown in FIG. 10, the baseband signal processing section 104 provided in the radio base station 11 is comprised at least of a candidate cell selection section 301, a calculation section 302, a connecting cell determining section 303 and a connecting cell reporting section 304.

The candidate cell selection section 301 selects candidate cells, with which a user terminal tries to connect. For example, referring to above FIG. 8, if a user terminal 20 that is connected to the radio base station 11 tries to connect with one of a plurality of radio base stations 12 (small base stations) (that is, executes CA), the candidate cell selection section 301 selects the radio base stations 12 (candidate cells) to be connecting candidates of the user terminal 20.

When lie above first example is employed, the candidate cell selection section 301 can select cells, the received power of which in the user terminal 20 is equal to or greater than a predetermined value, as candidate cells. For example, the cell with the highest received power in the user terminal 20, and cells with received power within a predetermined value (for example, X dB) from that highest received power, are selected as candidate cells. When the above second example is employed, the candidate cell selection section 301 can select cells, the received power of which in the user terminal 20 is equal to or greater than a predetermined value, or all the cells from which the user terminal 20 can receive downlink signals, as candidate cells.

Note that the candidate cell selection section 301 may specify the candidate cells based on information regarding the candidate cells selected on the user terminal 20 side, or determine the candidate cells based on information regarding the received power of each cell reported from the user terminal 20.

For every candidate cell, the calculation section 302 calculates the amount of data in each candidate cell per unit frequency band, the SINR that takes into account the traffic load in the other candidate cells, expected throughput that takes into account the frequency band that is used, an expected throughput metric that takes into account the amount of data which each candidate cell transmits to the serving user terminals, and so on.

When the above first example is employed, the calculation section 302 calculates the amount of data that remains in the buffer of each candidate cell per unit frequency band, by taking into account the frequency band that is used in each candidate cell (above equations 1 to 3 and so on).

On the other hand, when the above second example is employed, the calculation section 302 calculates each candidate cell's SINR, taking into account the received power of each candidate cell and so on, as well as the traffic load in the other candidate cells (above equations 4, 7 and so on). Also, the calculation section 302 calculates the expected throughput based on the SINR calculated, and the frequency band (BW) of the candidate cell (above equations 5, 8 and so on). Also, the calculation section 302 calculates an expected throughput metric, which takes into account the total amount of data that remains in the buffer of each candidate cell (above equations 6, 9, 10 and so on).

The connecting cell determining section 303 determines the cell (radio base station 12), with which the user terminal 20 connects, based on the calculation results in the calculation section 302. When the above first example is employed, the connecting cell determining section 303 determines a cell with a small amount of data as the connecting cell for the user terminal 20. Also, when the above second example is employed, the connecting cell determining section 303 determines a candidate cell with a large expected throughput metric as the connecting cell for the user terminal 20.

The connecting cell reporting section 304 controls the reporting of information regarding the connecting cell of the user terminal 20 based on the result determined in the connecting cell determining section 303.

In this way, by carrying out load balancing by taking into account the amount of data that remains in the buffer of each candidate cell per unit frequency band, instead of the number of user terminals connected to each candidate cell, it is possible to use radio resources effectively even when a plurality of small cells are placed densely.

Figure 11:
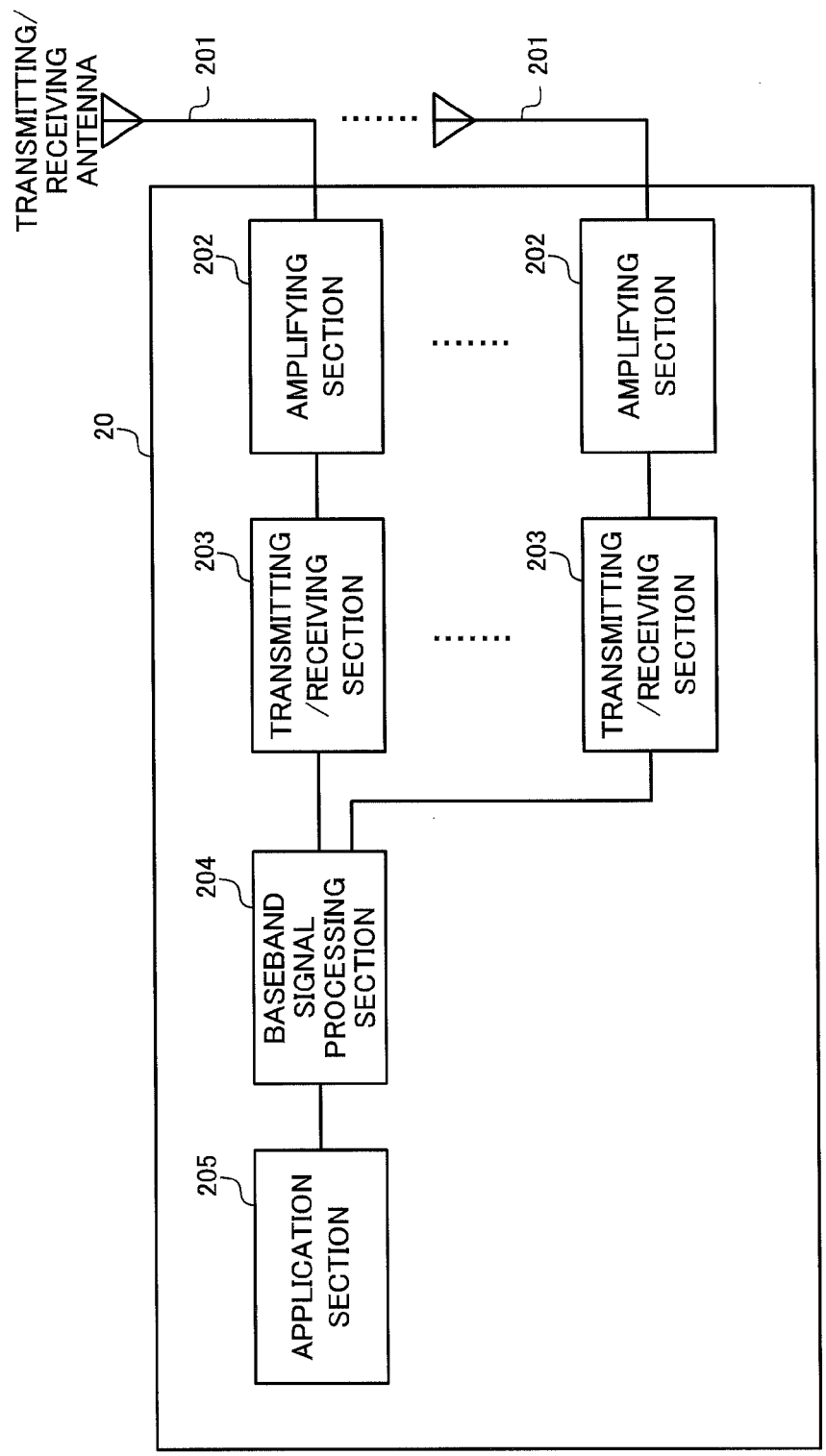
FIG. 11 is a diagram to explain an overall structure of a user terminal according to the present embodiment.

FIG. 11 is a diagram to show an overall structure of a user terminal 20 according to the present embodiment. The user terminal 20 has a plurality of transmitting/receiving antennas 201 for MIMO transmission, amplifying sections 202, transmitting/receiving sections (receiving sections) 203, a baseband signal processing section 204 and an application section 205.

As for downlink data, radio frequency signals that are received in a plurality of transmitting/receiving antennas 201 are each amplified in the amplifying sections 202, and subjected to frequency conversion and converted into baseband signals in the transmitting/receiving section 203. These baseband signals are subjected to an FFT process, error correction decoding, a retransmission control receiving process and so on, in the baseband signal processing section 204. In this downlink data, downlink user data is transferred to the application section 205. The application section 205 performs processes related to higher layers above the physical layer and the MAC layer, and so on. Also, in the downlink data, broadcast information is also transferred to the application section 205.

Meanwhile, uplink user data is input from the application section 205 into the baseband signal processing section 204. The baseband signal processing section 204 performs a retransmission control (HARQ (Hybrid ARQ)) transmission process, channel coding, pre-coding, a DFT process, an IFFT process and so on, and transfers the result to each transmitting/receiving section. The baseband signals that are output from the baseband signal processing section 204 are converted into a radio frequency band in the transmitting/receiving sections 203. After that, the amplifying sections 202 amplify the radio frequency signals having been subjected to frequency conversion, and transmit the results from the transmitting/receiving antennas 201.

Figure 12:
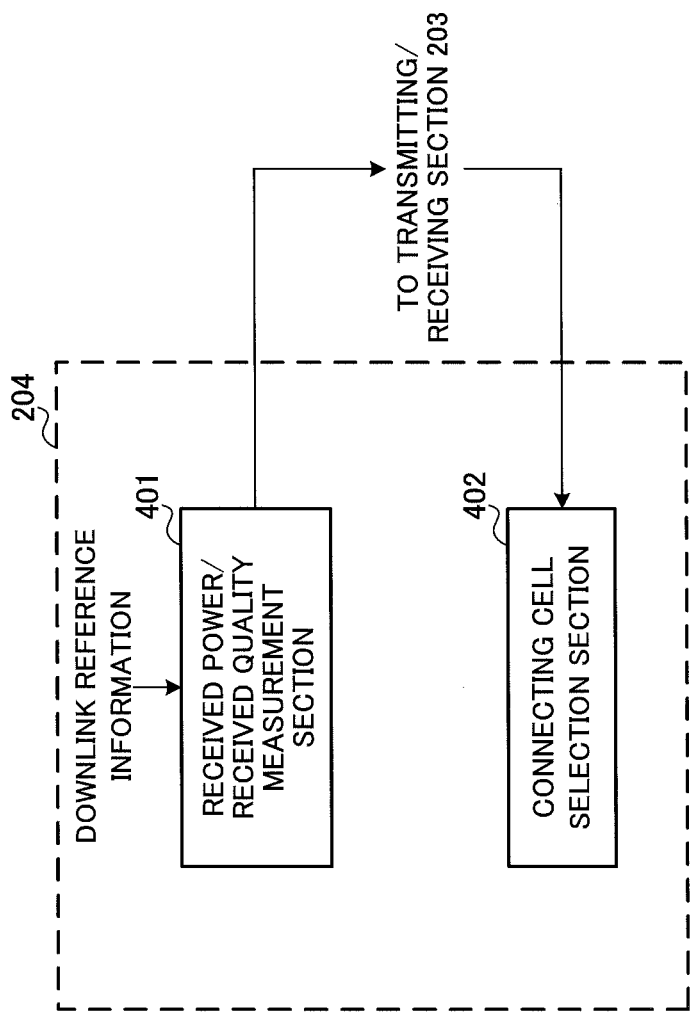
FIG. 12 is a diagram to explain a functional structure of a user terminal according to the present embodiment.

FIG. 12 is a diagram to show a principle functional structure of the baseband signal processing section 204 provided in a user terminal 20. As shown in FIG. 12, the baseband signal processing section 204 provided in the user terminal 20 is comprised at least of a received power/received quality measurement section 401 and a connecting cell selection section 402. Note that, as described earlier, the baseband signal processing section 204 has functional parts that carry out the retransmission control transmission process, channel coding, pre-coding, the DFT process, the IFFT process and so on.

The received power/received quality measurement section 401 measures the received power (RSRP) and the received quality (RSRQ) of downlink signals (downlink reference signals) transmitted from each radio base station 12 (candidate cell). Information regarding the received power (RSRP, RSRQ) measured in the received power/received quality measurement section 401 is reported to the radio base station 11 via the transmitting/receiving sections 203.

The connecting cell selection section 402 selects the radio base station 12, with which the user terminal 20 connects, based on the information regarding the connecting cell reported from the radio base station 11. Note that the connecting cell is the cell determined in the connecting cell determining section 303 in the radio base station 11, and, for example, a candidate cell, the received power and/or the received quality of which in the user terminal 20 is equal to or greater than a predetermined value, and in which the amount of data to transmit to the serving user terminals per unit frequency band is small.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. For example, a plurality of examples described above may be combined and implemented as appropriate. Consequently, the descriptions herein are provided only for the purpose of explaining examples, and should by no means be construed to limit the present invention in any way.

The disclosure of Japanese Patent Application No. 2013-099723, filed on May 9, 2013, including the specification, drawings and abstract, is incorporated herein by reference in its entirety.

The invention claimed is:

1. A radio base station that controls a connecting cell of a user terminal, comprising:
    a processor that selects candidate cells, received power and/or received quality of which in the user terminal is equal to or greater than a predetermined value;
    the processor calculates an amount of data to transmit to serving user terminals, for each candidate cell, by taking into account a frequency band that is used; and
    the processor determines a candidate cell where the amount of data is small, as the connecting cell of the user terminal.

2. The radio base station according to claim 1, wherein the processor selects a cell, the received power and/or the received quality of which in the user terminal is the highest, and cells, the received power and/or the received quality of which is within a predetermined value from the highest received power and/or received quality, as the candidate cells.

3. The radio base station according to claim 1, wherein the processor calculates the amount of data to correspond to each candidate cell by using following equation 1:

$$\text{Buffer}_{cell} = \frac{1}{BW_{cell}}(\text{Data}_{cell\_UE\#0} + \text{Data}_{cell\_UE\#1} + \dots ). \quad \text{(Equation 1)}$$

4. The radio base station according to claim 1, wherein, when a plurality of component carriers (CCs) are used in each candidate cell, the processor calculates the amount of data to correspond to each candidate cell on a per CC basis, and determines the cell, with which the user terminal connects, on a per component carrier basis.

5. A radio base station that controls a connecting cell of a user terminal, comprising:
    a processor that calculates an SINR of each candidate cell, with which the user terminal can connect, based on average traffic load in candidate cells other than the candidate cell and received power and/or received quality of each candidate cell, and also calculates expected throughput based on the calculated SINR and a frequency band that is used in the candidate cell; and
    the processor determines a candidate cell where the expected throughput, taking into account an amount of data which each candidate cell transmits to serving user terminals, is large, as the connecting cell of the user terminal.

6. The radio base station according to claim 5, wherein the processor further calculates an expected throughput metric, which normalizes the expected throughput with the amount of data which each candidate cell transmits to the serving user terminals.

7. The radio base station according to claim 6, wherein the processor calculates the SINR of each candidate cell by using following equation 4 and also calculates the expected throughput by using following equation 5, and the processor calculates the expected throughput metric by using following equation 6:

$$SINR_{cell} = \frac{RSRP_{cell}}{\alpha_1 RSRP_{Neighbor1} + \alpha_2 RSRP_{Neighbor2} + \ldots}$$ (Equation 4)

$$R_{cell} = BW_{cell} \log_2(1 + SINR_{cell})$$ (Equation 5)

$$\text{Metric}_{cell} = \frac{\beta_{cell}}{\text{Data}_{cell\_UE\#0} + \text{Data}_{cell\_UE\#1} + \ldots + \gamma_{cell}} R_{cell}.$$ (Equation 6)

8. The radio base station according to claim 5, wherein, when a plurality of component carriers (CCs) are used in each candidate cell, the processor calculates the SINR and the expected throughput per CC, and the determining section calculates the expected throughput metric per CC.

9. A user terminal that selects a predetermined cell from a plurality of candidate cells and connects with the cell, comprising:
   a transmitter that transmits information regarding received power and/or received quality of downlink signals transmitted from each candidate cell to a radio base station; and
   a processor that selects a connecting cell based on information regarding the connecting cell reported from the radio base station,
   wherein the connecting cell is a candidate cell, the received power and/or the received quality of which in the user terminal is equal to or greater than a predetermined value, and in which an amount of data to transmit to serving user terminals per unit frequency band is small.

10. A radio communication method for a user terminal and a radio base station that controls a connecting cell of the user terminal, comprising, in the radio base station, the steps of:
   selecting candidate cells, received power and/or received quality of which in the user terminal is equal to or greater than a predetermined value;
   for each candidate cell, calculating an amount of data to transmit to serving user terminals by taking into account a frequency band that is used; and
   determining a candidate cell where the amount of data is small, as the connecting cell of the user terminal.

11. The radio base station according to claim 2, wherein the processor calculates the amount of data to correspond to each candidate cell by using following equation 1:

$$\text{Buffer}_{cell} = \frac{1}{BW_{cell}}(\text{Data}_{cell\_UE\#0} + \text{Data}_{cell\_UE\#1} + \ldots).$$ (Equation 1)

12. The radio base station according to claim 2, wherein, when a plurality of component carriers (CCs) are used in each candidate cell, the processor calculates the amount of data to correspond to each candidate cell on a per CC basis, and determines the cell, with which the user terminal connects, on a per component carrier basis.

* * * * *